US007637177B2

(12) United States Patent
Haab et al.

(10) Patent No.: US 7,637,177 B2
(45) Date of Patent: Dec. 29, 2009

(54) DRIVE APPARATUS FOR A SLIDABLE DIVIDER ELEMENT, DRIVE ASSEMBLY AND DIVIDER ELEMENT

(75) Inventors: Gregor Haab, Baar (CH); Hans Wuthrich, Wettswil (CH); Marco Odermatt, Stans (CH)

(73) Assignee: Hawa AG, Mettmenstetten (CH)

( * ) Notice: Subject to any disclaimer, the term of this patent is extended or adjusted under 35 U.S.C. 154(b) by 972 days.

(21) Appl. No.: 11/219,708

(22) Filed: Sep. 7, 2005

(65) Prior Publication Data

US 2006/0060010 A1 Mar. 23, 2006

(30) Foreign Application Priority Data

Sep. 23, 2004 (EP) .................................. 04405607

(51) Int. Cl.
*F16H 27/02* (2006.01)
*F16H 29/02* (2006.01)

(52) U.S. Cl. ............................................ 74/89.2; 74/89

(58) Field of Classification Search ..................... 74/89, 74/89.2, 89.21, 89.22
See application file for complete search history.

(56) References Cited

U.S. PATENT DOCUMENTS 5,027,666 A * 7/1991 Filicetti ......................... 74/37
5,517,872 A * 5/1996 Anada ........................ 74/89.21
6,427,546 B2 * 8/2002 Alber ......................... 74/89.17
6,705,962 B2 * 3/2004 Schinzel ...................... 474/140
2003/0172755 A1 * 9/2003 Nagai et al. .................. 74/89.2
2003/0217610 A1 * 11/2003 Nagai et al. .................. 74/89.2

FOREIGN PATENT DOCUMENTS

DE 24 04 875 8/1975
EP 1 319 789 A1 6/2003
WO WO 2004/005656 A1 1/2004

* cited by examiner

*Primary Examiner*—Thomas R Hannon
*Assistant Examiner*—Justin Krause
(74) *Attorney, Agent, or Firm*—Oliff & Berridge, PLC

(57) ABSTRACT

The apparatus for driving a divider element which is slidable linearly and/or in curves, comprising a drive assembly guided by two running wheels on a running surface of a rail, the drive assembly having a drive shaft driven by an electric motor and a gearing, the drive shaft being coupled by a toothed gear to a toothed belt connected to the rail, and the drive assembly being connectable by a load shaft to the divider element. The drive assembly having a traveling assembly unit with a traveling assembly body having a head piece detachably connected to a drive unit, wherein the electric motor, and the gearing are arranged such that the drive shaft emerges vertically upward from the drive assembly so as to enable the toothed gear mounted on the drive shaft to engage the toothed belt retained above the running surface of the rail.

10 Claims, 8 Drawing Sheets

FIG. 16
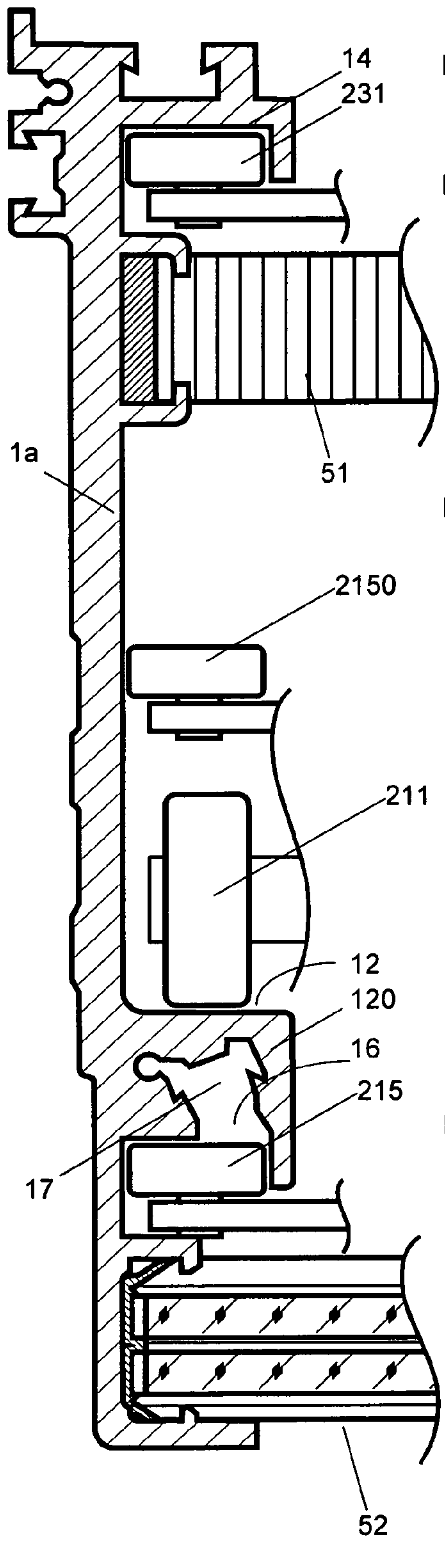
FIG. 16a
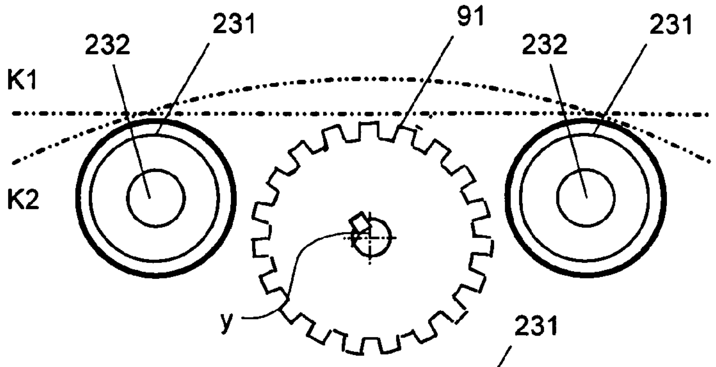
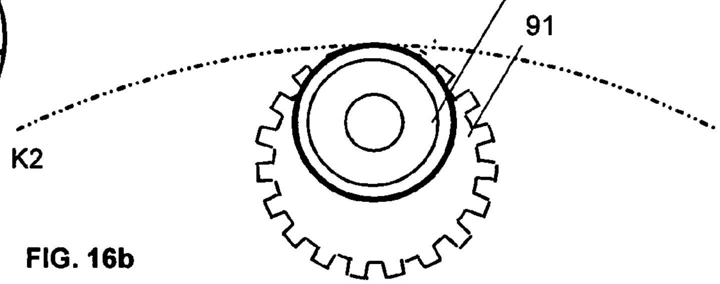
FIG. 16b
FIG. 16c
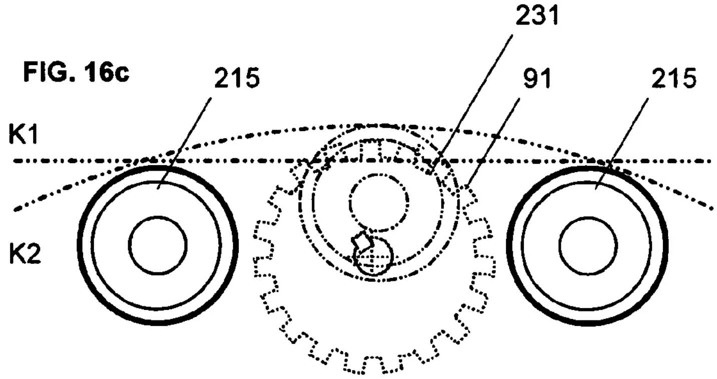

DRIVE APPARATUS FOR A SLIDABLE DIVIDER ELEMENT, DRIVE ASSEMBLY AND DIVIDER ELEMENT

This is a Nonprovisional application, which claims the benefit of European Patent Application No. 04 405 607.5 filed Sep. 23, 2004.

BACKGROUND

The invention relates to an apparatus for driving slidable, specifically, rotatable divider elements, as well as to a drive assembly for the drive apparatus, and a divider element driven by the drive apparatus.

Glass or wooden walls, sliding panels, doors, or shutters—hereafter called divider elements—which are immovably mounted or attached so as to move on drive assemblies slidable along a rail, and are optionally rotatably mounted and/or stackable or parkable—are often employed to separate or configure rooms, or to close off room or window openings.

Reference [1], WO 2004/005656, discloses the drive apparatus, illustrated below in FIG. 1 which serves to drive an optionally rotatable or parkable divider element 3 which is slidable linearly and/or in curves, and which is attached to at least two drive assemblies 2000, 2001 moving on a rail 100 and provided with running wheels 211, the first of these drive assemblies 2000 being provided with an electric motor 43 located between the running wheels. The vertical drive shaft of electric motor 43 is connected to a gearing 44 which is connected by flanges 61, 62 to a connector shaft 63 which in turn drives a toothed gear 91 engaging a toothed belt 51. Connector shaft 63 is rotatably supported at its upper end by a first flange 62 in the housing of drive assembly 2000 and at its lower end by a second flange 64 within a coupling piece 33. The solution disclosed in [1] provides a very compact design for the drive assembly provided with the drive motor and gearing.

The disadvantage of this solution, on the other hand, is the fact that a high degree of interdependence between individual elements of the apparatus results from the compact design, this interdependence having the effect that modifications and further developments of the drive assembly entail considerable expense.

Another drive for a sliding door wing guided along a rail and having a compactly designed drive assembly provided with a drive motor is described in [2], EP 1 319 789 A1. The drive motor, which is located on the side facing away from the door wing, that is, above a toothed gear engaging a toothed belt, and the single running wheel are accommodated in the drive assembly that is fixed to the door wing. The drive shaft of the drive motor is provided with a pinion which effectively engages a gear ring which is connected to a center element of the toothed gear, which gear is supported in a rotationally movable manner about its vertical axis of rotation by two bearing rings on a load shaft. The load shaft is supported in a rotationally movable manner about the under-load rotational axis by two spaced bearing rings located above the toothed gear on a drive assembly body of the drive assembly. The under-load rotational axis of the load shaft and the rotational axis of the toothed gear are thus arranged coaxially relative to each other—however, offset relative to the drive shaft of the drive motor. With this drive assembly as well, the arrangement of the load shaft and toothed gear also results in a compact design which, however, means that the toothed gear and the load shaft passing through this gear must be decoupled from each other by bearing rings—again resulting in undesirable interdependencies which figure prominently when examining the arrangement of the drive motor which must be installed very precisely in order to bring about the optimum effective connection between the pinion and the gear ring mounted on the toothed gear. Any changes in the dimensions of the drive assembly body or of the drive motor would most likely result in a relatively high modification expense. In light of the fact that the drive motor already has the design of a gear motor which is normally supplied by a specialized manufacturer, additional gearing elements to be installed in the apparatus by the user of the gear motor should be avoided. This is true especially in light of the fact that additional gearing elements result in relatively high fabrication, assembly and maintenance costs. This last fact is especially relevant since the pinion and gear ring are not integrated in a gearing unit so as to be protected, and the quality standard for the gearing manufacturer is essentially unattainable.

SUMMARY

The goal of this invention is therefore to create an improved drive apparatus specifically for divider elements which are slidable linearly or in curves, and are optionally rotatable or parkable. A drive assembly provided with this drive apparatus is also presented.

Specifically, the goal is to create a cost-effectively designed drive assembly of small dimensions in the which the apparatus's components have a reduced interdependence, thus enabling modifications and further developments of the drive assembly to be implemented simply, rapidly, and in a cost-effective manner.

In addition, the goal is to avoid decoupling or coupling elements which move or which contact moving parts, specifically, bearing or gearing elements provided by the user which result in an increase in fabrication or maintenance costs.

An additional goal is that the drive assembly according to the invention has further-improved travel characteristics, specifically, including during travel in tight curves, and ensure reliable coupling between the provided toothed gear and the toothed belt located in within the rail.

The apparatus which serves to drive a divider element which is slidable linearly and/or in curves, and is optionally rotatable or parkable, comprises a drive assembly a) which is guided by two running wheels on the running surface of a rail;

b) which has a drive shaft driven by an electric motor and a gearing, this shaft being coupled by a toothed gear to a toothed element, preferably a toothed belt, connected to the rail, and;

c) which is connectable through a load shaft to the divider element.

According to the invention, the drive assembly has a traveling assembly unit with a drive assembly body in which the load shaft emerging from the bottom side of the drive assembly body and two parallel shafts emerging in one plane vertically thereto from a first side of the drive assembly body are retained, and which drive assembly body has on its top side a head piece which is detachably connected to a drive unit in which the electric motor and gearing are arranged such that the drive shaft running parallel or in fact coaxially relative to the load shaft emerges upward from the drive unit so as to enable the toothed gear mounted on the drive shaft to engage the toothed belt retained above the running surface of the rail.

The solution according to the invention thus provides a clear spatial separation of drive assembly functions and a simple interface between the traveling assembly unit and drive unit whose apparatus components are completely decoupled from each other, apart from the required mechanical, preferably articulated, connection between the traveling assembly unit and drive unit. Here the load shaft and drive shaft, or the drive gear or toothed gear engaging the toothed belt, are completely decoupled from each other—thereby eliminating the need for any decoupling elements. The toothed gear is driven directly by the electric motor and attached gearing, preferably, a gear motor, forming a unit without any intermediate coupling by gearing elements. The result is thus a simple design for the drive assembly, reduced production cost, and minimum maintenance costs. An especially advantageous aspect is the fact that given the common interface and interconnection both the drive unit and traveling assembly unit are able to be further developed and maintained. It is thus possible at minimum development expense to replace the gear motor by a model of different dimensions, as long as the interior dimensions of the rail allow this. In addition, the manufacturer of the drive apparatus can thus procure the entire drive unit with corresponding quality specifications from one motor and gearing manufacturer who does not have to be responsible for issues relating to the drive assembly's engineering.

In an especially advantageous manner, the head piece of the traveling assembly unit, in which recesses for the partial accommodation of the running wheels can be provided, forms the base of the housing for the drive unit. As a result, the overall dimensions of these two interconnected units are further reduced—as is the expense for assembly and maintenance.

On the top side of the drive unit, preferably a guide unit is immovably or, preferably, detachably mounted—the guide unit optionally providing additional support for the drive shaft, for which purpose it is provided with a bearing element—which guide unit supports by means of shafts, the axes of which run parallel to the axis of the load shaft, one or two top guide elements, guide wheels or sliding elements spaced as closely as possible together and running in a top guide channel of the rail. At its top side, the drive assembly is guided by the top guide element(s) along a line or curve running parallel to the toothed belt, thereby always ensuring proper engagement of the toothed gear in the toothed belt. By using two top guide elements, any torques acting on the drive assembly, specifically, that caused by the drive unit, are compensated, and directional changes within the rail path are intercepted, thereby ensuring stable guidance for the drive assembly. In the event two top guide elements are used, the intervening vertical axis of the drive shaft, however, follows a line which in curved paths always exhibits greater distances relative to the toothed belt. These deviations from the minimum distance present in the case of straight rail sections change the engagement of the toothed gear in the toothed belt and are kept as small as possible—for example, by locating the top guide elements, or their axes, as close together as possible. However, this has the result that greater forces act on the top guide elements and that the drive assembly is not always guided with the same precision. For certain load or operating conditions, it may therefore be advantageous to provide bottom guide elements on the traveling assembly unit—or even a support element, support wheel, or sliding element. For example, two somewhat more widely spaced bottom guide elements can be provided which stabilize the drive assembly, while only one top guide element is used which ensures optimal engagement of the toothed gear in the toothed belt. To provide further decoupling of the traveling assembly unit and drive unit, these preferably have an articulated connection such that the drive unit along with the toothed gear can incline towards the toothed belt without the corresponding torques being transferred to the traveling assembly unit, or corresponding force effects on the guide elements being created (see FIG. 11).

The body of the traveling assembly, the housing of the drive unit, and the body of the guide unit are preferably able to be connected in a form-locking manner by flange elements, and are able to be screwed immovably together by at least one mounting screw passing completely through the housing of the drive unit. This aspect allows the three units mentioned to be quickly and stably connected in the simplest manner possible.

The load shaft is preferably a screw, the shaft of which is passed through a hole in a central component of the body of the traveling unit, and the head of which is retained in a correspondingly enlarged hole, projecting at least into the head piece of the traveling unit body, which hole is able to be closed by a securing element. The load shaft is thus able to be passed through the traveling assembly body until the screw head is retained preferably rotatably within the enlarged hole. The load shaft is thus retained directly adjoining the drive unit, practically within one housing component of this unit, and directed downward by the central component of the body of the traveling assembly. On both sides of the load shaft, the two shafts for the running wheels situated under the head piece on one side of the central component are retained in holes of the central component. It is thus possible to fabricate the body of the traveling assembly unit in a minimized size which nevertheless allows the described traveling assembly functions to be performed optimally, and also to serve as the basis for mounting the power transmission and control device.

On the bottom of the traveling assembly unit, a contacting module is preferably provided which contacts a two-wire electrical line for the power supply, this electrical line being located in a channel of the rail below the running surface for the running wheels.

A control module is mounted, preferably, on the shafts of the running wheels, on the second side of the traveling assembly unit opposite the running wheels, above the running surface for the running wheels.

The spatial conditions within the rail and the opportunities for installation provided by the body of the traveling assembly unit are thus combined and utilized in an optimal manner. A preferably tapered part of the central component along with the load shaft provided therein passes through the narrowing which is formed by rail elements provided on the two rail walls, the running surfaces being provided on the top sides of the rail elements. A channel is preferably integrated, at least in this part of the central component, which allows electrical power lines to pass downward through the narrowing to the control module or control lines by which, for example, control signals are transmitted to a closing device of the divider element.

The bottom of the above-mentioned rail element with the running surface preferably has an inner connecting channel capable of accommodating a connecting peg which is, or the opening of which is, preferably inclined inward, for example, by 30°, such that this peg, or screw elements provided in the connecting peg, are easily accessible with a tool introduced through the bottom opening in the rail. At the same time, the inclination of the inner connecting channel, or the differently inclined inner connecting channels of the two rail sides achieves the result that the two rail pieces are now aligned in multiple directions relative to each other and can be connected more precisely.

The two-wire electrical line inserted in the rail channel preferably comprises a plastic ribbon on which the electrical lines are provided and which is provided on both sides with elastic collars which lock into retaining strips provided on the edges of the rail channel. The two-wire electrical line can thus be pressed into the rail channel, the elastic collars being pressed together and locking in under the retaining strips, thereby securing the two-wire electrical line. As a result, installation can be performed quickly and does not require any additional means such as screws or adhesives.

The contacting module has elastically retained contact pins, preferably supported by spring elements, which are connected to a circuit board screwed onto the contacting module. The contacting module can thus be assembled and installed very easily.

BRIEF DESCRIPTION OF THE DRAWINGS

The following discussion explains the invention in more detail based on the drawings.

FIG. 16 shows left rail component 1*a* with running wheels 211, a support wheel 2150, as well as top and bottom guide elements 231, 215;

FIG. 16*a* shows the distance between toothed gear 91 and rail side 1 during travel through a curve K2 when using two top guide elements 231;

FIG. 16*b* shows the distance between toothed gear 91 and rail side 1 during travel through a curve K2 when using only one top guide element 231;

FIG. 16*c* shows the distance between toothed gear 91 and rail side 1 during travel through a curve K2 when using only one top guide element 231 and two bottom guide elements 215;

DETAILED DESCRIPTION OF EMBODIMENTS

Figure 1:
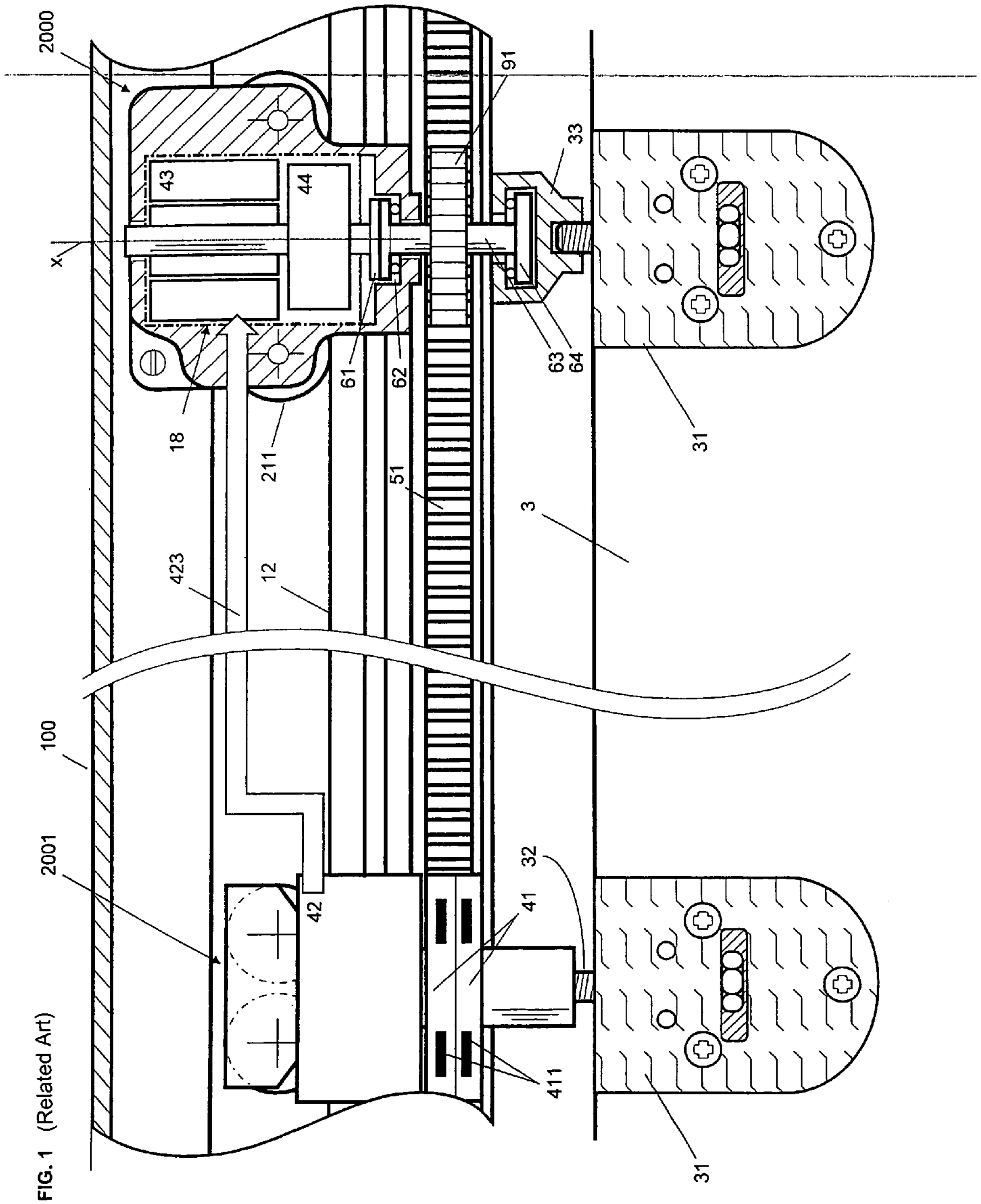
FIG. 1 (Related Art)
FIG. 1 shows the drive apparatus disclosed in [1] for a slidable and rotatable divider element 3.

FIG. 1 shows the drive apparatus [1] disclosed as referenced below which was described in the introduction.

Figure 2:
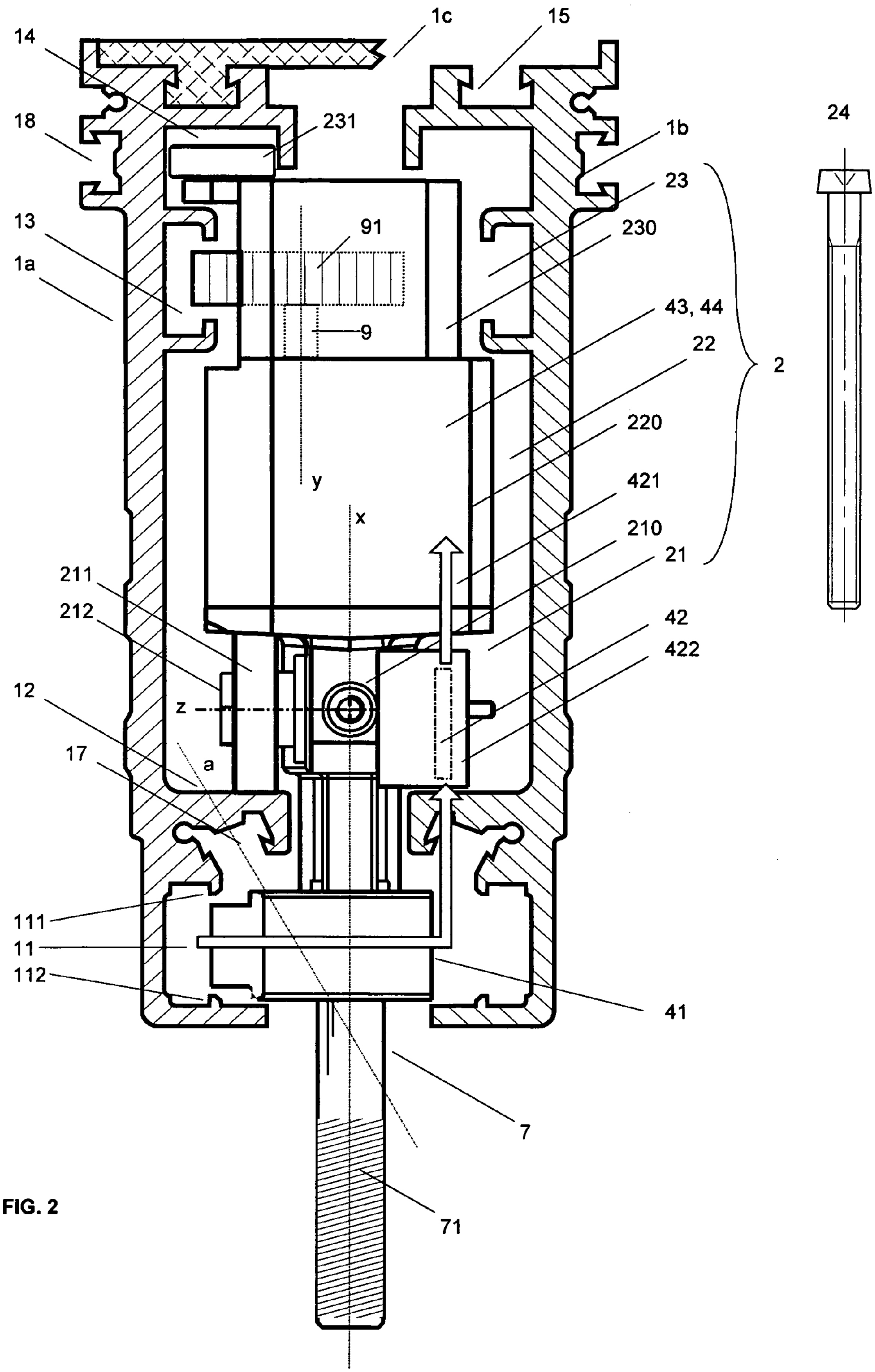
FIG. 2 shows a drive apparatus according to the invention comprising a drive assembly 2 guided within a rail 1, which drive assembly is composed of a traveling assembly unit 21, a drive unit 22, and a guide unit 23.

FIG. 2 shows, in a first embodiment, a rail 1 according to the invention, comprising a center component 1*c* which interconnects two side components 1*a*, 1*b*, and which for this purpose is anchored in corresponding channels 15 which run along the top sides of side components 1*a*, 1*b*.

Figure 3:
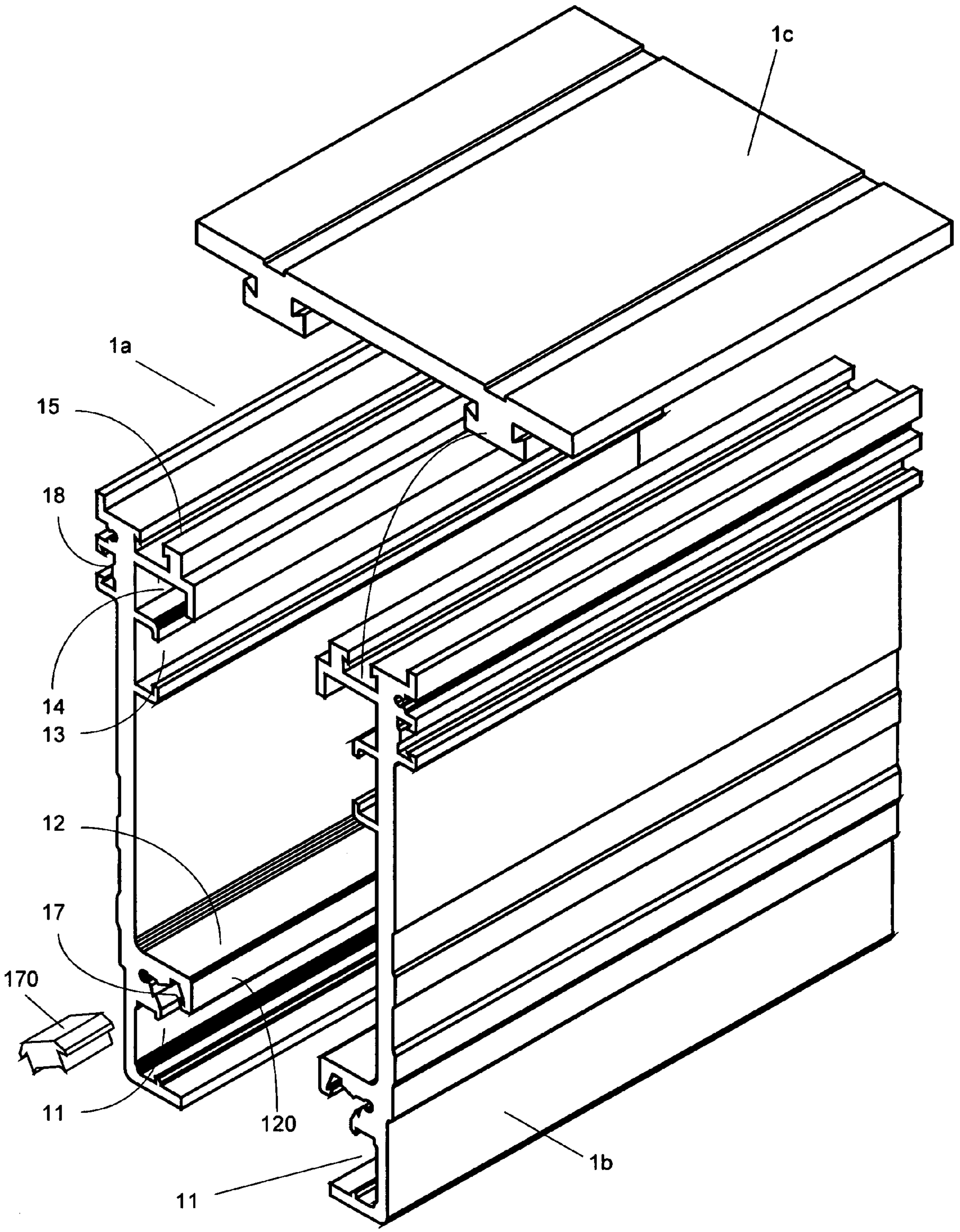
FIG. 3 is a three-dimensional view of the rail 1 of FIG. 2 which has two lateral components 1*a*, 1*b*, which are joined by a center component 1*c;*

FIG. 3 is a three-dimensional view of three-part rail 1 in FIG. 2.

Each of side components 1*a*, 1*b* has at the bottom a electrical line channel 11 open towards drive assembly 2 which serves to accommodate two-wire electrical line 52 (see FIGS. 4 and 15), at the extreme ends of which channel retaining strips 111, 112 are provided which serve to hold the inserted two-wire electrical line 52. Two-wire electrical line 52 comprises a plastic ribbon 522 on which electrical lines 521 are provided and which is provided on both sides with elastic collars 5221 that lock in after two-wire electrical line 52 is inserted against retaining strips 111, 112.

A rail element 120 is provided above electrical line channel 11, on the top side of which a running surface 12 is provided for running wheels 211 of drive assembly 2. On its bottom side, rail element 120 also has an inner connecting channel 17, which is inclined inward, capable of accommodating connecting peg 170. An outer connecting channel 18 is provided on the exterior of side components 1*a*, 1*b*, to accommodate connection peg 170. Connection pegs 170 are inserted into corresponding connecting channels 17, 18 by two end-face-abutting rail components 1 and are retained, for example, by screws the are provided on the front with cup points.

A drive guide channel 13 opening towards drive assembly 2 is provided above rail element 120 to accommodate toothed belt 51, while above this a top guide channel 14 opening downward is provided to receive top guide elements 231.

Figure 4:
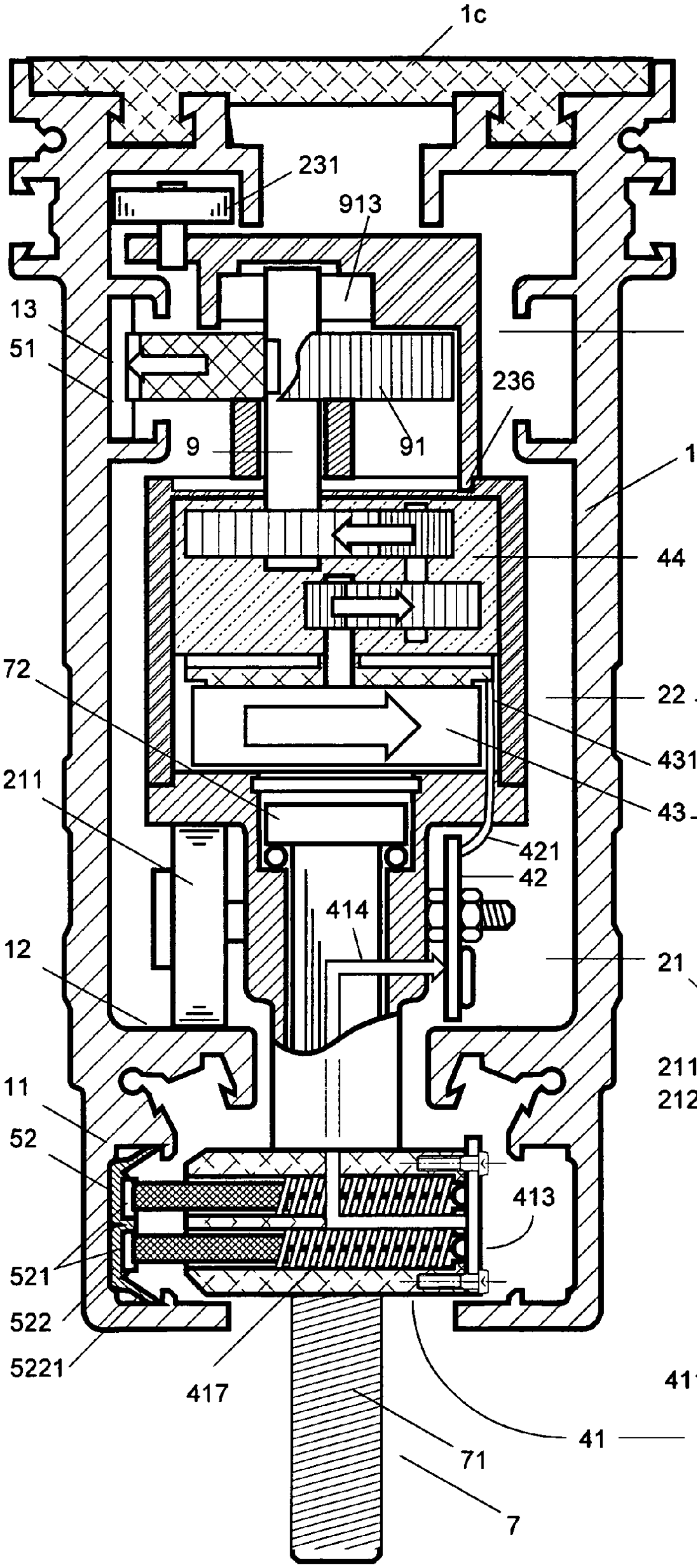
FIG. 4 is a sectional view of drive assembly 2 of FIG. 2.

Drive assembly 2 guided within rail 1, or along a rail component 1*a*—shown in a sectional view in FIG. 4—has a traveling assembly unit 21, a drive unit 22 located above traveling assembly unit 21, and in this preferred embodiment, a guide unit 23 located above drive unit 22, which components are connected by at least one mounting screw 24.

Traveling assembly unit 21 has a traveling assembly body 210 in which a load shaft 7 emerging outward at the bottom of traveling assembly body 210 and two parallel shafts 212 in a plane perpendicular thereto emerging on a first side from traveling assembly body 210 for running wheels 211 are held, and which traveling assembly body has on its top side a head piece 2101 which is detachably connected to drive unit 22.

Figure 11:
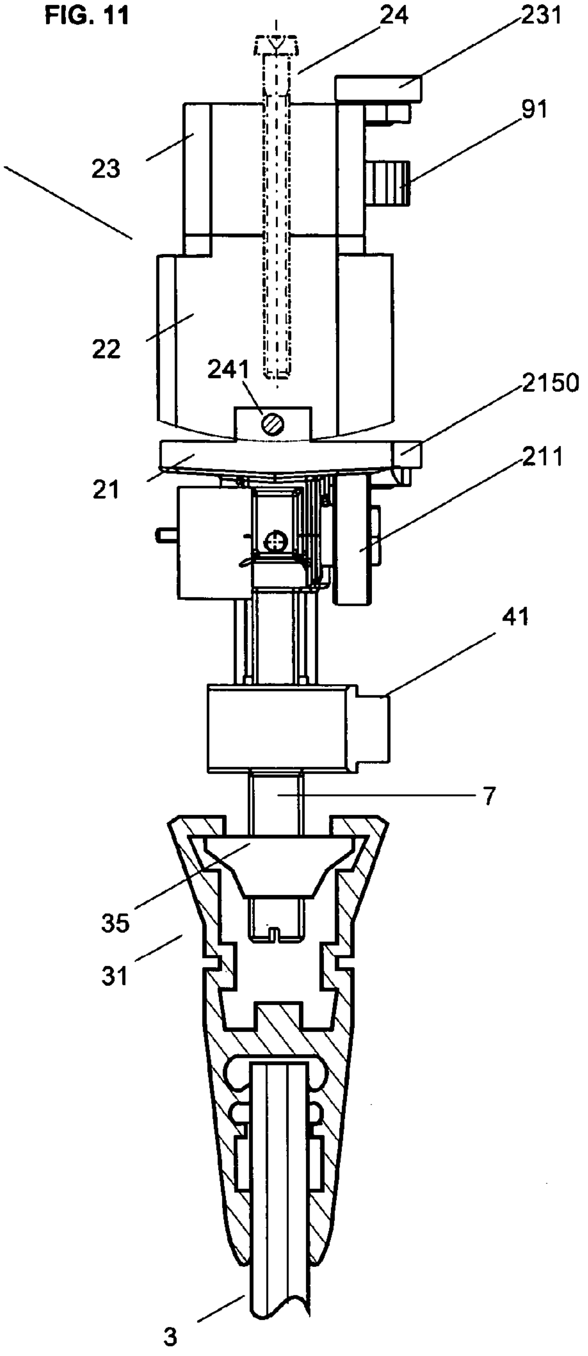
FIG. 11 is a side view of the modified drive assembly 2 of FIG. 8 with a profiled component 31 of divider element 3.

An electric motor 43 and a gearing 44, preferably, a gear motor, are located within drive unit 22 such that a drive shaft 9 parallel to load shaft 7 emerges upward out of drive unit 22 so as to enable toothed gear 91 mounted on drive shaft 9 to engage toothed belt 51 held above running surface 12 of rail 1. In order to reduce torques, the preferred approach is to have axes x or y of load shaft 7 and of drive shaft 9 run coaxially, or to have traveling assembly unit 21 and drive unit 22—as shown in FIG. 11—further decoupled from each other by connecting these in an articulated manner, for example, using a connecting shaft 241, so as to enable drive unit 22 to incline, freely movably or guided by the at least one top guide element 231, towards toothed belt 51. As a result, only those forces or torques are transmitted from drive unit 22 to traveling assembly unit 21 which are in a plane in which connecting shaft 241 and preferably also divider element 3 are located. In the event traveling assembly 21 and drive unit 22 are, on the other hand, immovably connected, any torques can be intercepted by a support wheel 2150 provided on traveling assembly unit 21 (FIG. 11 shows both possible embodiments).

Due to the advantageous functional and essentially mechanical decoupling as a result of the reduction to elementary connecting elements 24, 241, traveling assembly unit 21 and drive unit 22 can be designed independently of each other—an aspect which is especially advantageous. As a result, a commercially available gear motor can be easily employed without the need for additional gearing elements for the transmission of power to toothed gear 91 which is preferably coupled to drive shaft 9 by a spacer sleeve 911 and by a key 912. Due to the level of decoupling achieved, traveling assembly unit 21 can also be designed with minimal dimensions so as to completely fulfill the traveling assembly functions to be performed, the remaining space within rail 1 additionally allowing for the advantageous installation of contacting module 41 for the power supply, and of a control module 42 to control the electric motor.

Figure 7:
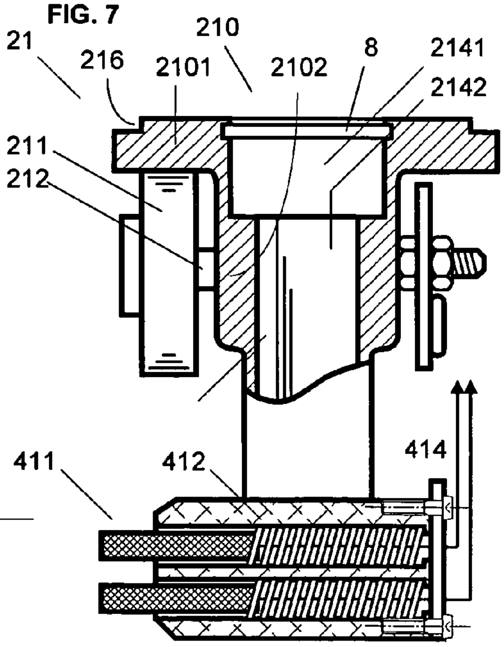
FIG. 7 shows traveling assembly unit 21 of FIG. 4 after disassembly together with a section through the holes 2141, 2142 provided to accommodate the load shaft 7.
Figure 18:
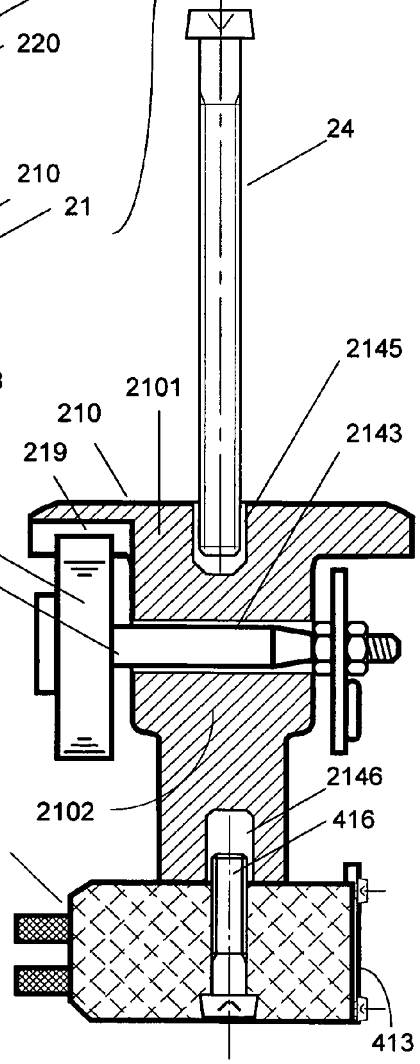
FIG. 18 shows traveling assembly unit 21 of FIG. 4 after disassembly, with a section through the holes 2143 provided to accommodate a running wheel shaft 212.

The separate traveling assembly unit 21 is shown in FIGS. 7 and 18 in various sectional views. FIG. 7 shows that load shaft 7 is a screw, the shaft 71 of which passes through a hole 2142 in a central component 2102 of body 210 of traveling assembly unit 21, and the head 72 of which is retained within a correspondingly enlarged hole 2141 projecting at least into the head piece 2101 of body 210 of traveling assembly unit 21, the hole being closed off by a securing element 8. Traveling assembly body 210 thus functions as a mount for load shaft 7 and in this regard provides an enlarged hole 2141 which is limited at the bottom by an annular flange element lying concentrically over the smaller hole 2142. A ring with rollers is preferably provided on this flange element which serves to support screw head 72. As FIG. 18 shows, traveling assembly body 210 has on both sides of enlarged hole 2141 one hole each to accommodate a running wheel shaft 212, the axes of which lie in a plane which is penetrated vertically by axis x of load shaft 7. Running wheel shafts 212 are preferably immovably retained within traveling assembly body 210 such that they can serve to support running wheels 211 on the one side of traveling assembly body 210 (see the ball bearing in FIG. 14), and function as a mount for control module 42.

In the embodiment shown, head piece 2101 of traveling assembly body 210, in which recesses 219 are provided for the partial accommodation of running wheels 211, forms the base of the housing 220 of drive unit 22, thereby enabling a smaller overall height to be realized. FIG. 18 also shows threaded holes 2145, 2146, which serve to accommodate mounting screw 24 and a screw 416 by which contacting module 41 is mounted on the bottom side of traveling assembly unit 21.

Contacting module 41 has contact pins 411 supported by springs 417, which contact pins are connected to circuit board 413 screwed on to contacting module 41, from which circuit board power supply lines 414 are routed through a channel 2144 provided in traveling assembly body 210 to control module 42 from which control lines 421 are routed, preferably, through a flat cable to electric motor 43. Power supply lines are thus protected by traveling assembly body 210 when passing through the narrowing formed by rail elements 120 which project towards each other. Control module 42, for example, a printed and component-equipped circuit, is covered by a plate 422 so as to be mechanically and electrically protected.

Figure 5:
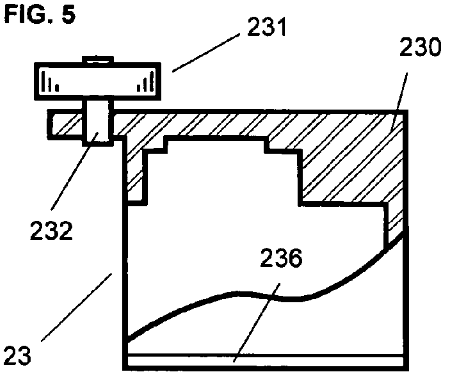
FIG. 5 is a sectional view of the guide unit 23 of FIG. 4 after disassembly.
Figure 6:
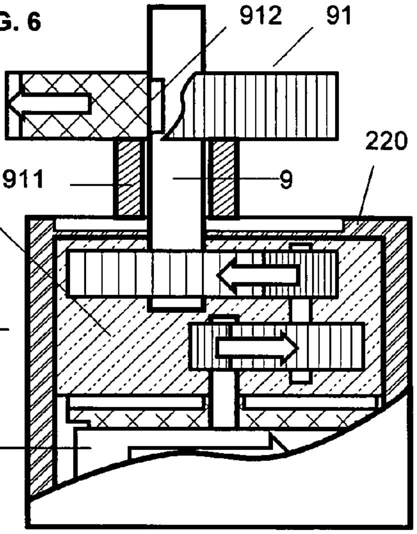
FIG. 6 is a sectional view of drive unit 22 of FIG. 4 after disassembly.

FIG. 6 shows the simply designed drive unit 22 on which guide unit 23 shown in FIG. 5 is mounted, which unit has a body 230 into which at least one guide shaft 232 for guide element 231 is inserted, the guide element 231 running within rail 1 along top guide channel 14.

Traveling assembly body 210, housing 220 of drive unit 22, and body 230 of guide unit 23 are able to be connected to each other in a form-locking manner by flange elements 216, 236, and are able to be immovably screwed together by at least one mounting screw 24 passing completely through housing 220 of drive unit 22, and are thus able to be installed and disassembled very quickly.

Figure 8:
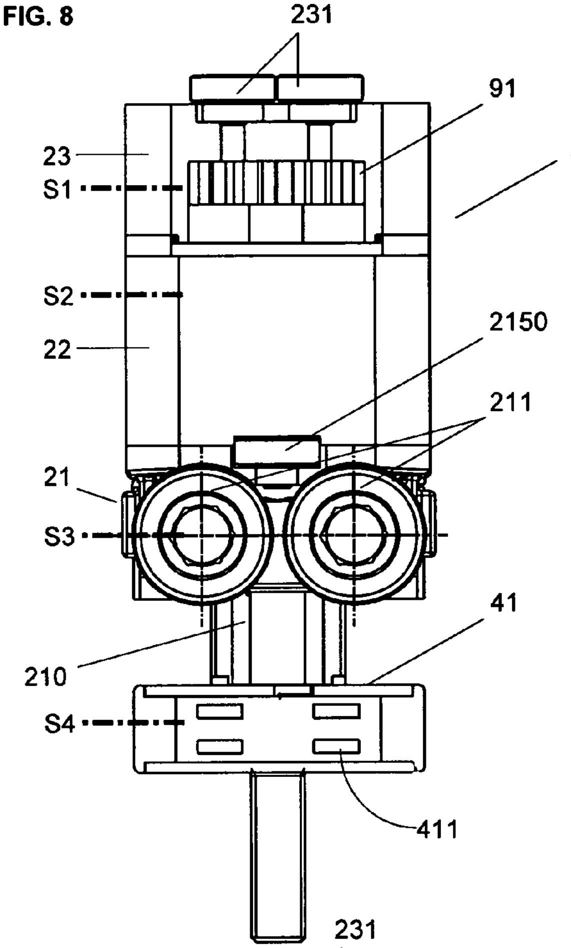
FIG. 8 shows drive assembly 2 of FIG. 2 with various lines of intersection S1, . . . , S4, additionally provided with a support wheel 2150.
Figure 9:
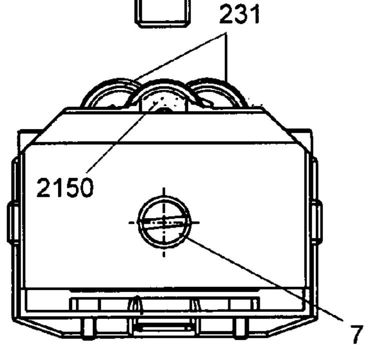
FIG. 9 shows drive assembly 2 of FIG. 8 as seen from below.
Figure 10:
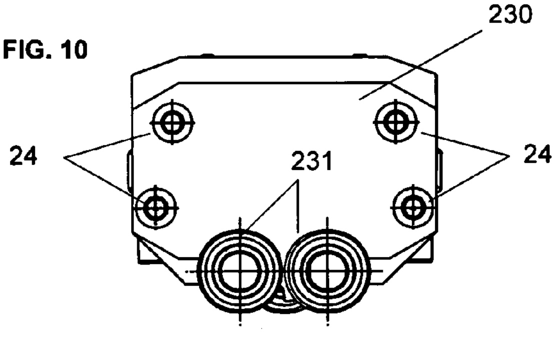
FIG. 10 shows drive assembly 2 of FIG. 8 as seen from above.

FIG. 8 shows drive assembly 2 of FIG. 2 now additionally provided with support wheel 2150 with the various intersection lines S1, . . . , S4. FIG. 9 shows drive assembly 2 as viewed from below. FIG. 10 shows drive assembly 2 of FIG. 8 as viewed from above. FIG. 11 shows the modified drive assembly 2 of FIG. 8 from the side, connected with a profiled component 31 of divider element 3. As described above, any disturbing torques are able to intercepted by support wheel 2150 provided on traveling assembly body 210. Based on the articulated connection between traveling assembly 21 and drive unit 22 shown in FIG. 11, any disturbing force effects and torques can are completely eliminated. The articulated connection can be easily implemented using a connecting shaft 241 which is inserted into corresponding holes within traveling assembly body 210 and housing 220. Traveling assembly 21 and drive unit 22 can thus be separated by removing connecting shaft 241.

Figure 12:
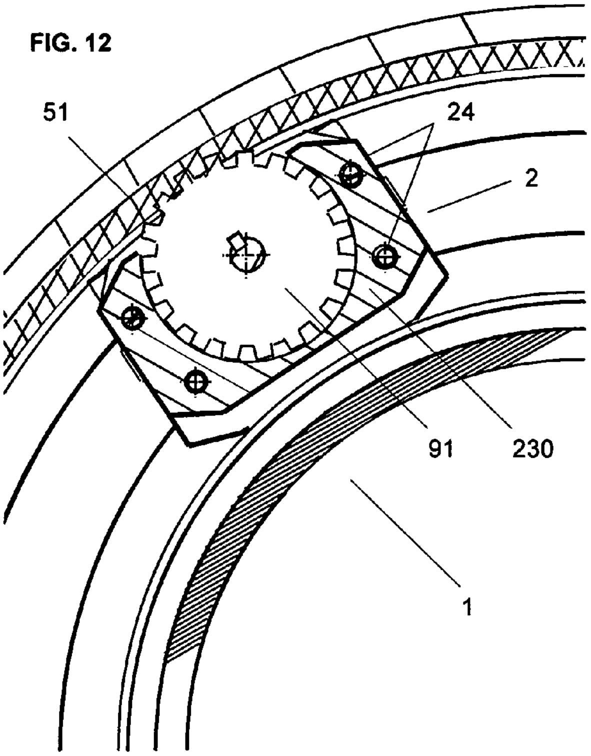
FIG. 12 shows drive assembly 2 of FIG. 8 in cross-section along intersection line S1 with exposed toothed gear 91 which engages the toothed belt 51.

FIG. 12 shows drive assembly 2 of FIG. 8 in cross-section along intersection line S1 with exposed toothed gear 91 which engages toothed belt 51.

Figure 13:
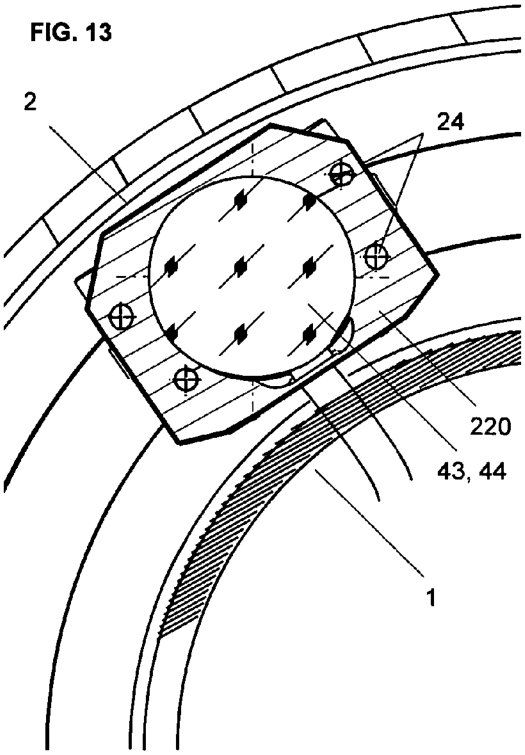
FIG. 13 shows drive assembly 2 of FIG. 8 in cross-section along intersection line S2 with exposed drive motor 43.

FIG. 13 shows drive assembly 2 of FIG. 8 in cross-section along intersection line S2 with exposed drive motor 43.

Figure 14:
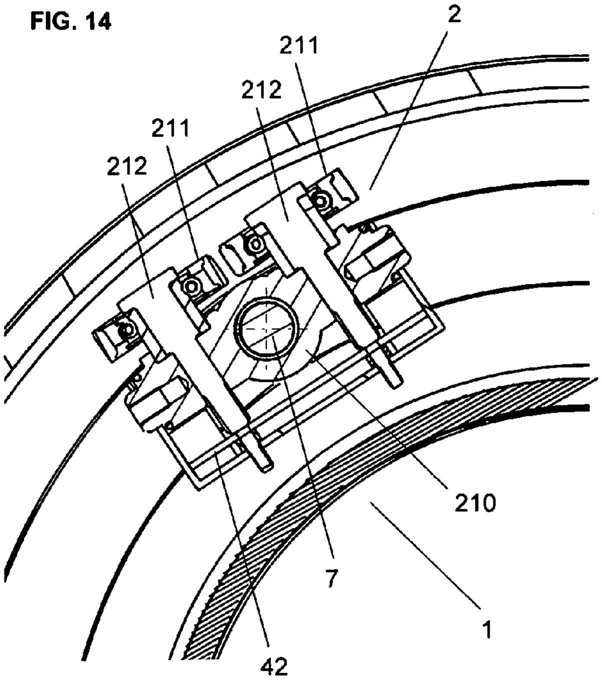
FIG. 14 shows drive assembly 2 of FIG. 8 in cross-section along intersection line S3 with a cutaway view of running wheels 211 and their shafts 212.

FIG. 14 shows drive assembly 2 of FIG. 8 in cross-section along intersection line S3 with a cutaway view of running wheels 211 and their shafts, as well as elements of a ball bearing.

Figure 15:
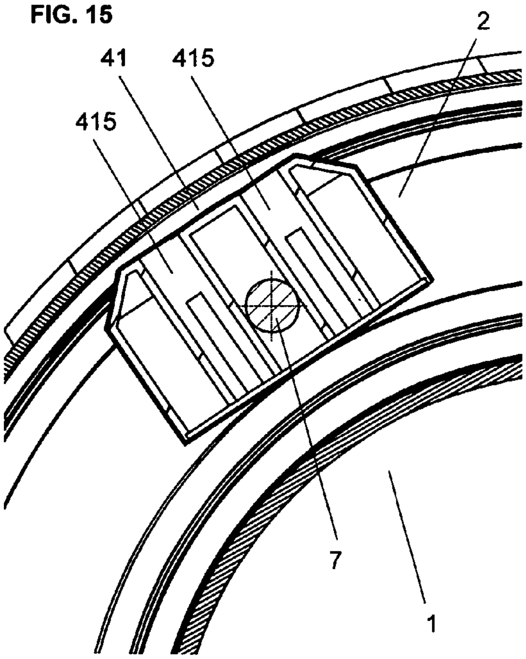
FIG. 15 shows drive assembly 2 of FIG. 8 in cross-section along intersection line S4 with a cutaway view of contacting unit 41.

FIG. 15 shows drive assembly 2 of FIG. 8 in cross-section along intersection line S4 with a cutaway view of contacting unit 41 in which channels 415 are provided for contact pins 411 which are supported by springs 417.

FIG. 16 shows rail component 1*a* in which rail element 120 provided with running surface 12 is provided on its bottom side with inner connecting channel 17 and additionally guide channel 16 opening downward, in which channel one or two guide elements 215 connected to traveling assembly body 210 are routed.

Figure 17:
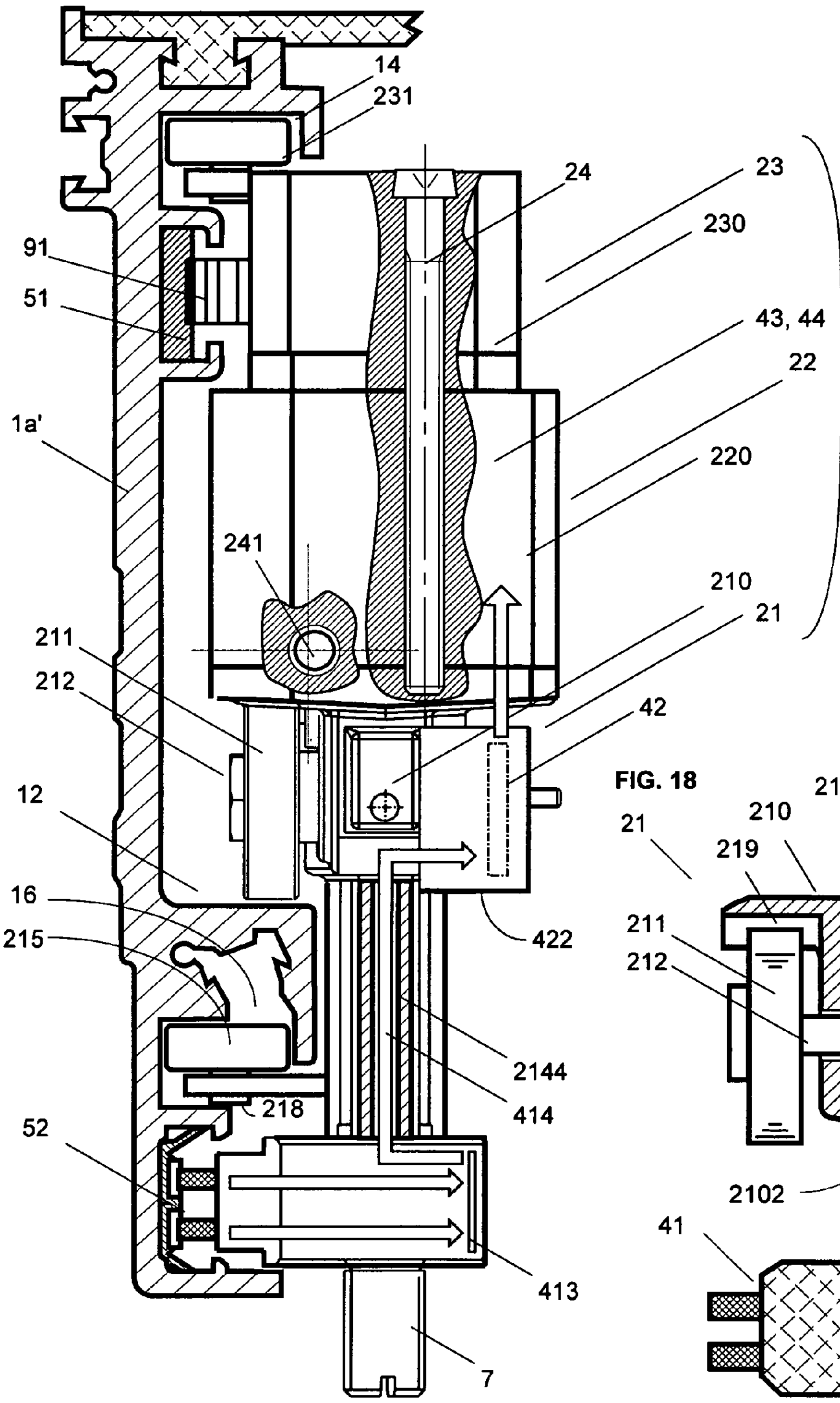
FIG. 17 shows drive assembly 2 guided within rail 1 with a top and bottom guide channel 14, 15, in which one top guide element 231 and two bottom guide elements 215 are guided.

FIG. 16*a* shows two top guide elements 231 running within a curve K2. FIG. 16*b* shows one top guide element 231 running within curve K2, which guide element together with toothed gear 71 is able to precisely follow the path of the toothed belt. The use of two top guide elements 231 enables any torques acting on the drive assembly, specifically, from drive unit 22, to be compensated and any directional changes in the rail path to be intercepted, thereby allowing drive assembly 2 to be guided in a stable manner. In the event two top guide elements 231 are used, the intervening axis y of drive shaft 9 does, however, follow a line which in curved paths takes on increasingly larger distances from toothed belt 51. As the distance between the guide shafts 232 of the top guide elements 231 increases, the distance from toothed gear 91 increases. This distance can therefore be reduced by reducing the relative distance between the guide shafts 232 as much as possible. However, this action results in a situation in which greater forces act on top guide elements 231, and drive assembly 2 is no longer guided with the same precision. For certain load and operating conditions, it may therefore be advantageous to provide two bottom guide elements 215 by which drive assembly 2 is guided in a stable manner. As a result, it is possible to employ a top guide element 231 which ensures the optimum engagement of the toothed gear in the toothed belt. FIG. 17 shows a drive assembly 2 designed accordingly with one top guide element 231 and two bottom guide elements 215. The drive assembly 2 shown in FIG. 11 can also be designed analogously in which the optimum engagement of toothed gear 91 in toothed belt 51 is always ensured. FIG. 17 thus shows both alternatively usable approaches for connecting traveling assembly unit 21 and drive unit 22, that is, the fixed connection using mounting screw 24 and the articulated connection using shaft 241.

It is also possible to advantageously implement the solution according to the invention if, in place of running wheels 211 and running surfaces 212, sliding elements to carry divider element 3 are provided which are supported on sliding surfaces of the rail.

The invention claimed is:

1. Drive apparatus for a divider element which is slidable linearly and/or in curves, comprising a drive assembly which is guided by two running wheels on a running surface of a rail, which drive assembly has a drive shaft driven by an electric motor and a gearing, the drive shaft being coupled by a toothed gear to a toothed belt connected to the rail, and which drive assembly is connectable by a load shaft to the divider element, characterized in that the drive assembly has a traveling assembly unit with a traveling assembly body in which the load shaft, emerging from the bottom of the traveling assembly body, and two parallel wheel shafts for the running wheels, emerging in a plane perpendicular to the load shaft on a first side from the traveling assembly body, are held, and which traveling assembly body has on its top side a head piece which is detachably connected to a drive unit in which the electric motor and the gearing are arranged such that the drive shaft running parallel or coaxially relative to the load shaft emerges upward out of the drive unit so as to enable the toothed gear mounted on the drive shaft to engage the toothed belt retained above the running surface of the rail.

2. Drive apparatus according to claim 1, characterized in that the head piece of the traveling assembly unit forms the base of the housing of the drive unit or in that an articulated connection between the traveling assembly unit and the drive unit is provided by means of a connecting shaft.

3. Drive apparatus according to claim 1, characterized in that on the drive unit a guide unit is detachably mounted and which guide unit supports by means of guide shafts, the axes of which run parallel to the axis (x) of the load shaft, one or two top guide elements, guide wheels or sliding elements spaced from one another and running in a top guide channel of the rail.

4. Drive apparatus according to claim 1, characterized in that the traveling assembly body of the traveling assembly unit, the housing of the drive unit, and the body of the guide unit are connectable in a form-locking manner by flange elements, and are able to be immovably screwed together by at least one mounting screw running completely through the housing of the drive unit.

5. Drive apparatus according to claim 1, characterized in that the traveling assembly unit carries at least one support wheel provided above the running surface of the rail, which support wheel is able to roll along the inner wall of the rail, and/or that the traveling assembly unit carries by means of support shafts parallel to the axis (x) of the load shaft one or two bottom guide elements, guide wheels, or sliding elements within a bottom guide channel of the rail.

6. Drive apparatus according to claim 1, characterized in that the load shaft is a screw, the shaft of which passes through a hole within a central component of the traveling assembly body of the traveling assembly unit, and the head of which is retained in a correspondingly enlarged hole which projects at least into the head piece of the traveling assembly body of the traveling assembly unit, the enlarged hole being closable by a securing element.

7. Drive apparatus according to claim 1, characterized in that the traveling assembly unit is connected at the bottom to a contacting module which contacts a two-wire electrical line to supply power, the two-wire electrical line being located in a channel of the rail below the running surface for the running wheels.

8. Drive apparatus according to claim 1, characterized in that the two-wire electrical line comprises a plastic ribbon on which the electrical lines are provided, and which is provided on both sides with electrical collars which lock in to retaining strips provided on the edges of the channel; and/or that the contacting module has spring-loaded contact pins which are connected to a circuit board screwed on to the contacting module.

9. Drive apparatus according to claim 1, characterized in that the traveling assembly unit carries a control module on the second side opposite the running wheels above the running surface for the running wheels, the control module being retained by the wheel shafts of the running wheels; that the control module is connected to the contacting module by power supply lines which pass through a channel in the body of the traveling assembly unit; and that the control module is connected to the drive motor by control lines.

10. Divider element comprising a drive apparatus according to claim 1.

* * * * *